July 8, 1969  P. H. ZAVOD  3,454,752
AUTOMATIC SPEED CONTROLLER FOR PROPELLER SHAFTS
Filed March 30, 1966

INVENTOR
PIERCE H. ZAVOD
BY
ATTORNEY

United States Patent Office 3,454,752
Patented July 8, 1969

3,454,752
AUTOMATIC SPEED CONTROLLER FOR
PROPELLER SHAFTS
Pierce H. Zavod, King of Prussia, Pa., assignor to the
United States of America as represented by the Secretary of the Navy
Filed Mar. 30, 1966, Ser. No. 538,935
Int. Cl. G06g 7/18
U.S. Cl. 235—193                                   5 Claims

ABSTRACT OF THE DISCLOSURE

The present invention relates to novel and improved apparatus for automatically controlling the speed of a rotating shaft. A speed controller unit receives one signal which is indicative of the rotating shaft speed and another signal which is indicative of a desired shaft speed. A detector is provided for developing an error signal and a differentiator for developing a rate of change signal are arranged in parallel, and these adjusted signals are modified for finally producing a control signal which is used to regulate the shaft speed.

---

The invention described herein may be manufactured and used by or for the Government of the United States of America for governmental purposes without the payment of any royalties thereon or therefor.

This invention will be described in association with an engine in which speed of the engine shaft is the variable of operation being controlled by regulating the flow of energy supplied to the engine for operating the shaft.

The principal object of the invention is to control the speed of a rotating shaft by a signal which is the sum of the error between the actual shaft speed and the desired shaft speed multiplied by a constant and the rate of change of the shaft speed multiplied by a constant wherein the constant is determined by the characteristics of the engine which operates the shaft.

Other objects, advantages and novel features of the invention will become apparent from the following detailed description of the invention when considered in conjunction with the accompanying drawings, wherein.

Figure 1:
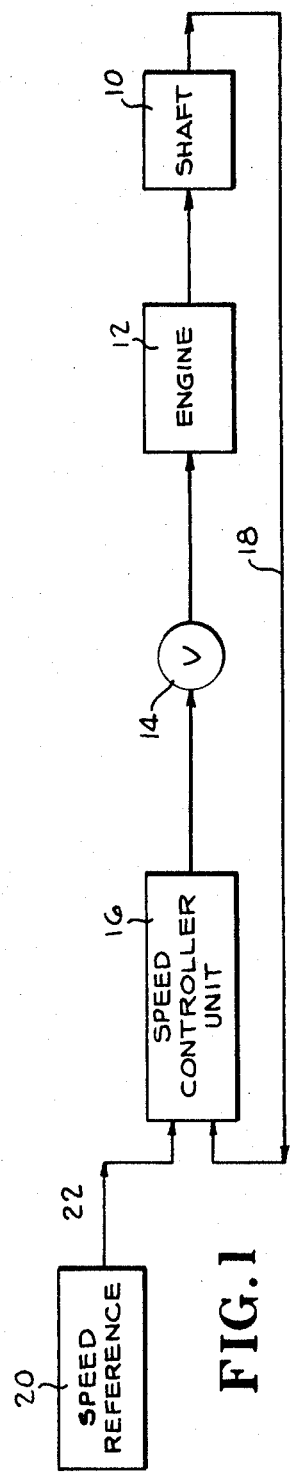
FIGURE 1 is a block diagram of the speed control system of the invention.

The speed control system of the invention, as depicted in FIGURE 1, is of the feedback type that is, the speed control of a shaft 10 is effected by comparing the actual speed of the shaft with a reference speed and obtaining and utilizing the difference between the two speeds in the control of the speed of rotation of the shaft 10. In the diagram of FIGURE 1 then, the shaft 10 is operated by engine 12 in accordance with the fuel energy supply through the valve 14. The energy supply through the valve 14 is regulated by means of the output from a speed controller unit 16 to which is transmitted the actual speed of shaft 10 by feedback line 18 from the shaft and the reference speed from source 20 which is transmitted by line 22.

Figure 2:
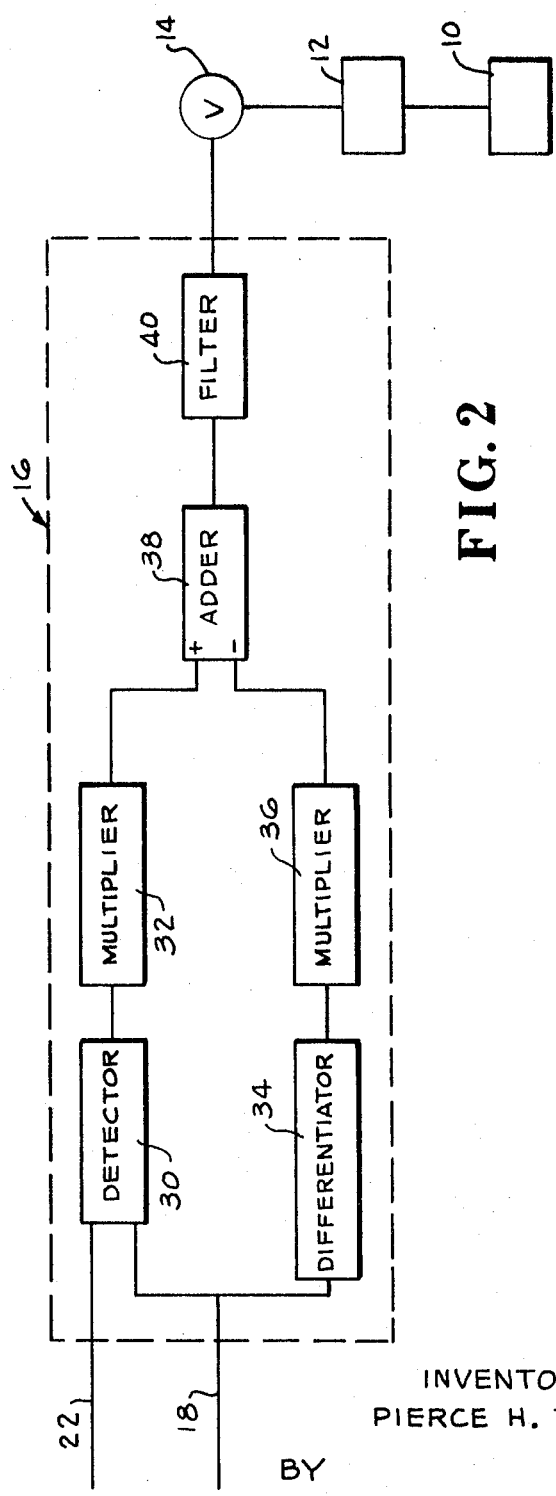
FIGURE 2 is a block diagram of the functional elements of the speed controller unit of FIGURE 1.

The speed control system of this invention differs from the known prior art feedback speed control systems in the functional operations carried out by the speed controller unit 16 of FIGURE 1. For an understanding of this speed controller unit reference should be had to FIGURE 2 wherein the various elements of the speed controller unit 16 are labeled to indicate their respective functions. The labelled equipment of FIGURE 2 may be formed of mechanical, pneumatic or electronic components, although in practicing the invention electronic components might be selected because of their ready commercial availability and assembling. Assuming that electronic equipment is used, a tachometer generator or equivalent device will be located in feedback line 18 and the reference speed transmitted by line 22 will be a voltage signal. The voltage signals from lines 18 and 22 will both be supplied to the detector 30 which functions to detect the difference between the actual speed of rotation of shaft 10 and the reference speed at 20 which will be the desired speed at which it is desired to operate the shaft 10. The output signal developed in detector 30 will be proportional to the difference between the two speed signals transmitted by lines 18 and 22 and this signal is then transmitted to the multiplier 32. This signal output from 30 is modified in multiplier 32 by a constant value which will depend on or be determined in accordance with the particular type of engine employed for operating the shaft 10, that is, the constant value will be determined by the physical and operational characteristics of the engine 12 which in turn may be determined empirically for example. The actual shaft signal from line 18 will also be transmitted to a differentiator 34 simultaneously with its transmission to the detector 30. The differentiator 34 functions to sense the actual shaft speed and is operative to produce a dampening signal which is proportional to the rate of change of the shaft speed of rotation. The dampening signal produced in 34 is operative to limit the rate of change of speed of shaft 10 in order to prevent it from overshooting the reference speed 20. The signal from the differentiator is then transmitted to multiplier 36 wherein it is modified by a constant value which is determined as in the case of multiplier 32 in accordance with the type of engine employed for operating shaft 10. The detector 30 and multiplier 32 are connected in series with an adder 38 and the differentiator 34 and multiplier 36 are also connected in series with the adder 38. Since the feedback signal through line 18 is transmitted to both the detector 30 and differentiator 34 simultaneously, the detector 30 and multiplier 32 are arranged in parallel with the differentiator 34 and multiplier 36. The adder is operative to add the outputs from the multipliers algebraically and to produce a signal which is equal to the difference between the outputs of the multipliers. The output from multiplier 32 will be added in a positive direction and the output from multiplier 36 will be added in a negative direction as shown by the adder 38. A filter 40 is provided to adjust the signal by removal of unwanted frequencies and adapt it for use with the frequency characteristics of the particular engine being operated. The final output signal from the filter produces a control signal which is then transmitted to valve 14 for regulating the energy supply to the engine 12 which in turn determines the speed of rotation of shaft 10.

Obviously many modifications and variations of the present invention are possible in the light of the above teachings. It is therefore to be understood that, within the scope of the appended claims, the invention may be practiced otherwise than as specifically described.

I claim:
1. A system for controlling the speed of rotation of an engine driven shaft, comprising:
   (a) a speed controller unit for receiving a first and second signal, said first signal being indicative of the speed at which it is desired to rotate the shaft and said second signal being indicative of the actual speed of shaft rotation;
   (b) and wherein said speed controller unit comprises:
      (1) detector means for developing an error signal between the first and second signals;
      (2) differentiator means for developing a rate of change signal from the speed of shaft rotation signal;

(3) means for modifying the error signal and the rate of change signal by a factor which is based on the physical characteristics of the engine;

(4) and adder means receiving the modified signals and producing a signal which is equal to the difference between said modified signals.

2. A system for controlling the speed of rotation of an engine driven shaft as set forth in claim 1, further characterized by:

(a) said modifying means including a first multiplier for the detector means and a second multiplier for the differentiator means.

3. A system for controlling the speed of rotation of an engine driven shaft as set forth in claim 2, further characterized by, (a) said detector means and said first multiplier being arranged in series relation with the adder means and said differentiator and said second multiplier being arranged in series relation with the adder means.

4. A system for controlling the speed of rotation of an engine driven shaft as set forth in claim 2, further characterized by, (a) said detector means and said first multiplier and said differentiator and second multiplier being arranged in parallel relation with each other other and in series relation with the adder means.

5. A system for controlling the speed of rotation of an engine driven shaft as set forth in claim 2, further characterized by, (a) said detector means and said first multiplier and said differentiator and said second multiplier being arranged in parallel relation with each other and in series relation with the adder means, and (b) filter means in series with the adder means to provide a control signal having the frequency characteristics of the particular engine being used.

References Cited

UNITED STATES PATENTS

| | | | |
|---|---|---|---|
| 2,919,384 | 12/1959 | Guarino et al. | 317—5 |
| 3,046,450 | 7/1962 | Martin | 317—5 |
| 3,098,176 | 7/1963 | Eggenberger et al. | 317—5 |
| 3,198,985 | 8/1965 | Haskell | 317—5 |
| 3,277,287 | 10/1966 | Spriggs et al. | 235—193 X |

MALCOLM A. MORRISON, *Primary Examiner.*

JOSEPH F. RUGGIERO, *Assistant Examiner.*

U.S. Cl. X.R.

235—150.2; 317—5